United States Patent [19]

Stevenson

[11] Patent Number: 4,507,087
[45] Date of Patent: Mar. 26, 1985

[54] CLOSED FINGER PAINTING DEVICE

[75] Inventor: Rosemary C. Stevenson, Buies Creek, N.C.

[73] Assignee: Inventions International Incorporated, Coats, N.C.

[21] Appl. No.: 643,473

[22] Filed: Aug. 23, 1984

[51] Int. Cl.³ ............................................. G09B 23/22
[52] U.S. Cl. ...................................... 434/98; 40/406; 272/8 D; 446/267
[58] Field of Search ................. 40/406; 272/8 R, 8 D, 272/8 N; 434/81, 84, 98, 102; 446/267

[56] References Cited

U.S. PATENT DOCUMENTS

| | | | |
|---|---|---|---|
| 3,415,590 | 12/1968 | Adler | 434/98 X |
| 3,647,279 | 3/1972 | Sharpless | 272/8 D X |
| 3,758,695 | 9/1973 | Goodman | 434/84 |
| 3,898,781 | 8/1975 | Facchini | 272/8 D X |
| 4,057,921 | 11/1977 | Ball | 40/406 |
| 4,395,835 | 8/1983 | Schneider | 40/406 |
| 4,419,283 | 12/1983 | Schneider | 40/406 X |

OTHER PUBLICATIONS

"Touch Me" p. 36 of Childcraft Education Corp., Toys that Teach, 1971, Catalog, Bayonne, New Jersey.

Primary Examiner—Harland S. Skogquist
Attorney, Agent, or Firm—Mills & Coats

[57] ABSTRACT

The present invention relates to a closed finger painting system that is adapted to be both clean and reusable. Provided is a rigid base member to which a number of closed, clear, flexible bags are attached. The bags are particularly adapted to be overlapped with respect to each other. Each bag contains a colorful, transparent fluid. The fluids can be manipulated within each bag by pressing the bags with one's fingers. When the fluids in more than one bag overlap, they create an optical impression of being mixed to create new colors. Therefore, an infinite variety of distinctive, abstract designs can be created.

10 Claims, 2 Drawing Figures

CLOSED FINGER PAINTING DEVICE

FIELD OF INVENTION

The present invention relates to educational materials and toys for children and more particularly to educational materials and toys specifically designed to stimulate artistic creativity.

BACKGROUND OF INVENTION

Finger painting has been among the favorite activities of children for many years. Parents too, have favored finger painting because it provides an entertaining and educational activity for their children. Finger painting encourages artistic creativity and teaches the combining of primary colors into secondary and tertiary colors. However, finger painting is messy and must always be performed in a suitable place. Furthermore, finger painting materials can be depleted making the activity somewhat costly.

SUMMARY AND OBJECTS OF INVENTION

The present invention presents a closed finger painting system which is both clean and reusable. A number of colorful and transparent, fluids are individually enclosed in clear plastic bags. The bags are then overlapped. By pressing, squeezing, and moving one's fingers over the bags, the respective fluid therein can be manipulated to create an almost infinite variety of distinctive abstract designs.

It is the object of the present invention to provide a method and apparatus for finger painting which is clean and can be used in virtually any place.

It is also an object of the present invention to provide a method and apparatus for finger painting in which the materials used are not depleted, but can be reused.

A further object of the present invention is to provide a method and apparatus for finger painting which gives the optical impression of mixed fluids without actually mixing fluids.

Another object of the present invention is to stimulate artistic creativity among children.

Still another object of the present invention is to provide a device of the character referred to above that teaches children the art of combining primary colors to form secondary and tertiary colors.

Yet another object of the present invention is to provide a method and apparatus for finger painting which is inexpensive.

Other objects and advantages of the invention will become apparent from a review of the following description and accompanying drawings which are merely illustrative of such invention.

DESCRIPTION OF INVENTION

Figure 1:
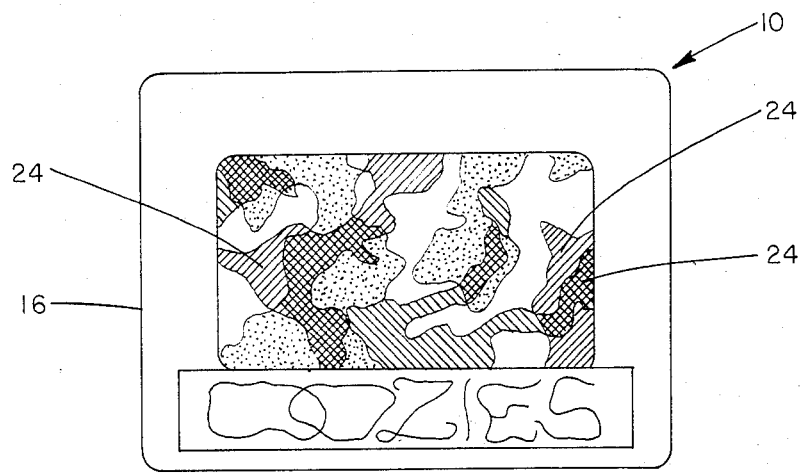
FIG. 1 is a top plan view of the closed finger painting device of the present invention with the top thereof being folded downwardly onto the base.

With further reference to the drawings, the closed finger printing device is shown therein and indicated generally by the numeral 10.

Viewing closed finger painting device 10 in more detail, it is seen that the same includes a base 12 and a top 16. Base 12 is a solid rectangle constructed of a rigid material, i.e., wood, plastic, cardboard, etc., and includes an outer perimeter area 13 and an interior area 14 that lies inwardly of the perimeter area.

Top 16 is also a rectangle constructed of a rigid material and includes a viewing window 20 made of clear plastic. Top 16 and base 12 are joined along one edge by a hinge 22, which in the present embodiment is simply a strip of plastic glued along one edge of both base 12 and top 16.

Figure 2:
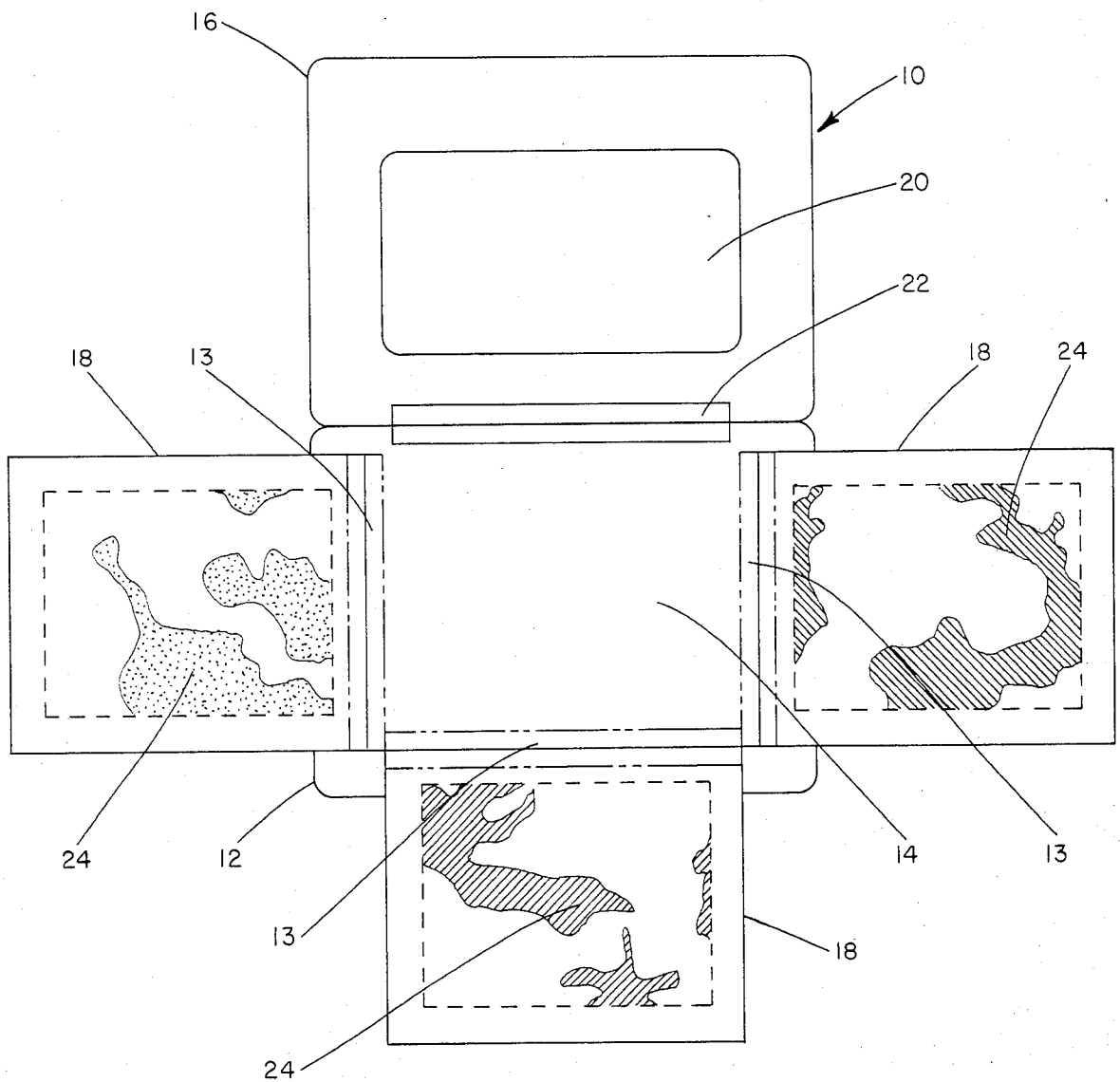
FIG. 2 is a top plan view of the closed finger painting device of the present invention with the respective colored fluid filled containers thereof being disposed within an outer non-use overlapped position.

A plurality of clear, rectangular plastic bags 18 are attached along the perimeter area 13 of base 12. Only one edge of each bag 18 is attached so that each bag can be folded either into the interior area 14 of base 12 (FIG. 1) or outward from said base 12 (FIG. 2). In the normal position all three bags are folded into the interior area 14 of base 12 where they overlap with respect to each other. In this position, top 16 is folded down onto bags 18 sandwiching the same between base 12 and top 16. It is appreciated, however, that top 16 can be lifted up and that bags 18 can be folded outward individually. Therefore, a person using closed finger painting device 10 may elect to overlap only selective bags 18 or to use only one such bag 18.

Each bag 18 contains a distinctive colored fluid composition 24 which serves as finger painting medium. Each colored composition 24 comprises a colored solution including corn syrup and food coloring which combine to create a single, homogenous, colorful fluid. It is appreciated that a different color food coloring is used in each bag so that each bag will have a different color fluid. In the embodiment of the present invention described herein, red, blue and yellow food coloring was used respectively in each of three bags, but other colors may be used. In addition to the color solution, cooking oil is added to each bag to provide a base for the color solution of corn syrup and food coloring. The cooking oil does not mix with the colored fluid solution but is simply a cushion upon which the colored fluids can float or move against. Each bag is sealed to contain these fluids so that closed finger painting device 10 will be reusable.

It is appreciated that in the present embodiment the elements or ingredients of the colored fluid composition 24 are edible and are non-toxic.

To use colored finger painting device 10 one simply selects the colors that one wishes to use and then folds the appropriate bags 18 inward so that the same overlap about the interior area 14 of base 12. Top 16 is then folded down so that said bags 18 are sandwiched between base 12 and top 16. In this position, the bags 18 are visible through viewing window 20. The fluids in each bag can then be manipulated by pressing the bags 18 through viewing window 20. It is seen that the fluids tend to move away from the point of pressure. It is further seen that when the colored fluids 24 in more than one bag 18 overlap, the same creates an optical impression of being mixed to create secondary or tertiary colors. Therefore, an infinite variety of distinct, abstract designs can be created.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A hand and finger manipulative device for creating different colors and designs that is both entertaining and educational, comprising: a closed hand and finger painting means for presenting a hand and finger manipulative closed painting system of overlapping and individually packed colored fluids that can be manipulated by hand and finger to create a wide variety of designs, said closed hand and finger painting means including a base structure having a perimeter area and an interior area defined inwardly of the perimeter area; a plurality of closed, clear, flexible bag-like containers secured to said base structure so that said flexible containers assume a normal overlapped position with one flexible container lying over another and a plurality of different colorful, transparent, viscous fluids each of which is enclosed within one of said flexible bag-like containers such that said fluids give an optical impression of being mixed when said containers assume said normal overlapped position where said fluids lie one over another such that said fluids can be pressed, squeezed and otherwise manipulated by hand and finger within the respective bag-like containers to create different color combinations in an infinite variety of distinctive and colorful designs.

2. The finger and hand manipulative device for creating different colors and different designs of claim 1 wherein said flexible containers are movably secured to the perimeter area of said base structure and are movable from the normal overlapped position in which said containers overlap and lie one above the other over said interior area of said base to a second position in which said flexible bag-like containers extend outward from said interior area of base structure.

3. The finger and hand manipulative device for creating different colors and different designs of claim 2 wherein respective fluids comprise a colored solution including corn syrup and food coloring.

4. The finger and hand manipulative device for creating different colors and different designs of claim 3 wherein respective fluids further comprise a clear fluid enclosed within each container and specifically adapted to carry said colored solution without mixing with the same.

5. The finger and hand manipulative device for creating different colors and different designs of claim 4 wherein said clear fluid includes cooking oil.

6. A hand and finger manipulative device for creating different colors and different designs that is both entertaining and educational, comprising: a closed hand and finger painting means for presenting a hand and finger manipulative closed painting system having overlapping and individually packed colored fluids that can be manipulated by hand and fingers to create a wide variety of designs, said closed hand and finger painting means including a holding frame base structure having a base and a top, said top including an opening formed within the same for viewing into said base, said base including a perimeter area and an interior area defined inwardly of said perimeter area, a plurality of closed, clear, flexible bag-like containers secured to said base structure; a plurality of different colorful, transparent, viscous fluid each of which is enclosed within one of said flexible bag-like containers; means for movably mounting said plurality of containers along the defined perimeter area of said base in order that the respective containers can be swung from an outer position where the containers lie outside of said defined interior area to an overlapped position where the respective containers lie in the defined interior area one above the other; and wherein said fluids give an optical impression of being mixed when said containers assume the overlapped position within said defined interior area and wherein in this position said fluids can be pressed, squeezed and otherwise manipulated within said closed bag-like containers to create an infinite variety of distinctive and colorful designs.

7. The finger and hand manipulative device for creating different colors and different designs of claim 6 wherein said top is pivotally secured to said bottom so that said top can swing open away from said flexible containers or closed to lie adjacent the same.

8. The closed finger painting device of claim 7 wherein said top further includes a clear, flexible window which extends over said opening.

9. A method of creating a closed hand and finger manipulative painting pad comprising:
   A. filling a plurality of clear, flexible bag-like containers with a variety of colorful, transparent, and viscous fluids;
   B. closing said containers to contain the fluids within the same;
   C. securing said containers to a base; and
   D. overlapping said flexible filled containers such that the containers lie one above the other and the overlapping fluids give an optical impression that the fluids are mixed so as to form a relatively soft pliable hand and finger manipulating pad, whereby a variety of different and colorful designs can be created by squeezing, pressing and otherwise manipulating said flexible containers so as to cause the fluids therein to move about and within the respective containers.

10. The method of claim 9 further including the step of securing said respective bag-like containers around a perimeter area defined on said base that includes an interior area defined interiorly of said perimeter area; and moving respective bag-like containers from an outer non-use position where respective containers extend outwardly of said defined interior area to an inner overlapped position where said plurality of bag-like containers lie in said defined interior area with the respective container overlapping such that one container lies above another.

* * * * *